(12) United States Patent
From et al.

(10) Patent No.: US 8,515,406 B2
(45) Date of Patent: Aug. 20, 2013

(54) COMMUNICATION METHOD AND A COMMUNICATION SYSTEM FOR TAILORED MOBILE COMMUNICATION

(75) Inventors: Taru From, Helsinki (FI); Mikko Leppänen, Helsinki (FI); Tarja Pääkkönen, Helsinki (FI); Hannu Lohi, Kello (FI); Timo Soininen, Helsinki (FI); Kalle Takkinen, Helsinki (FI)

(73) Assignee: Sunduka Oy, Kello (FI)

( * ) Notice: Subject to any disclaimer, the term of this patent is extended or adjusted under 35 U.S.C. 154(b) by 0 days.

(21) Appl. No.: 13/298,994

(22) Filed: Nov. 17, 2011

(65) Prior Publication Data
US 2012/0129507 A1    May 24, 2012

(30) Foreign Application Priority Data

Nov. 19, 2010 (EP) .................................. 10191836

(51) Int. Cl.
*H04M 3/02* (2006.01)
(52) U.S. Cl.
USPC ........... 455/415; 455/413; 455/517; 370/409; 379/142.01; 379/207.13
(58) Field of Classification Search
USPC ................. 370/352, 401, 328, 467; 379/230, 379/88.2, 211.02, 207.15, 207.02, 142.01, 379/218; 455/414.2, 417, 11, 458, 428, 404.1, 455/410, 415, 431, 466, 445, 405, 406; 380/247, 249, 279
See application file for complete search history.

(56) References Cited

U.S. PATENT DOCUMENTS

| | | | |
|---|---|---|---|
| 6,341,161 B1 * | 1/2002 | Latter et al. | 379/142.01 |
| 7,934,206 B2 * | 4/2011 | Butler et al. | 717/140 |
| 7,940,908 B2 * | 5/2011 | Sprigg et al. | 379/201.02 |
| 2001/0005842 A1 * | 6/2001 | Le Gendre et al. | 707/1 |
| 2001/0027109 A1 * | 10/2001 | Minborg et al. | 455/458 |
| 2003/0050052 A1 * | 3/2003 | Minborg et al. | 455/415 |
| 2003/0063730 A1 * | 4/2003 | Woodring | 379/207.15 |
| 2007/0195942 A1 * | 8/2007 | Woodring | 379/207.15 |
| 2008/0205608 A1 * | 8/2008 | Tal et al. | 379/93.01 |
| 2010/0091676 A1 * | 4/2010 | Moran et al. | 370/252 |
| 2011/0250874 A1 * | 10/2011 | Shah et al. | 455/415 |

FOREIGN PATENT DOCUMENTS

EP    1 744 526 A1    1/2007

OTHER PUBLICATIONS

European Search Report for priority application EP 10191836.5, having a completion date of Apr. 6, 2011.
European Office Action in corresponding European Application No. 10191836.5-1858, dated Feb. 14, 2013.

* cited by examiner

*Primary Examiner* — Mahendra Patel
(74) *Attorney, Agent, or Firm* — Andrus, Sceales, Starke & Sawall, LLP

(57) ABSTRACT

The invention relates to a method and system for tailored communication between at least two mobile clients. In the communications system, calling party data is conveyed from a library server to the called mobile client before a voice initiation message of the calling mobile client to the called mobile client. The called mobile client presents the tailored calling party data on the display of the called mobile client when the mobile client is alerting. Also the calling party may get from the library server the tailored data of the called party.

23 Claims, 8 Drawing Sheets

COMMUNICATION METHOD AND A COMMUNICATION SYSTEM FOR TAILORED MOBILE COMMUNICATION

TECHNICAL FIELD

The invention relates to a method for tailored communication where wireless communication devices are utilized. The invention also relates to a wireless communication device that utilizes said tailored communication method. The invention relates also to a computer program product that is utilized in the wireless device for accomplishing the tailored communication method.

BACKGROUND

Communication between people has been increasing rapidly. People are constantly communicating with each other by using e.g. telephones, mobile terminals or personal computers for communication. A substantial amount of this communication can be attributed to more than 6 billion mobile terminal users. Conventional voice calling is the most known application among mobile terminal users. There are roughly 3000 billion voice calls annually carried out by the mobile terminal users.

Nowadays, the mobile terminals are used for many different types of communication such as communicating with work colleagues and clients as well as communicating with family and friends. A certain amount of calls is also used for other purposes, such as e.g. marketing and customer relationship management.

In today's busy environment, when being called to, the mobile terminal user would like to know who is calling. Furthermore, the mobile terminal user would like to know from which organization or association the call is made. This is important for the mobile terminal user so that he/she is able to get some time for mental preparation before answering the call.

Often the communicating parties want easy and effective communication, i.e. the parties want to minimize the time wasted and prefer the communication to be easy, fast and "to-the-point". Therefore also the person originating the call would benefit from that the called mobile terminal user were able to know more about the person calling and were able to prepare himself/herself prior to answering the call.

Also the caller may want to know that he or she has actually called to the person intended. Technical means for ascertaining the called party identity is not available during a voice call that utilizes voice call procedures of the known prior art. In some intimate context this could be very important to both parties i.e. to the caller person and to the called person.

Some measures are not possible to be accomplished during the conventional voice call. Therefore, in some cases at least one of the parties of the voice call has to establish a data transfer connection to the one and same party via a data communication network. This may be frustrating if that kind of an operation recurs very often.

Some solutions are known in the art for overcoming the above mentioned problem of knowing more about the caller of the incoming call. A standard solution is to look for the number of the incoming call from the address book of the mobile terminal receiving the call. Many of the numbers of the incoming callers may typically be stored in the address book of the receiving mobile terminal. However, this does not satisfy the user if the number of the caller is not in the address book.

Furthermore, there are prior art service solutions, where a link is provided to an external phonebook for checking the name of the number holder of the incoming call. These prior art service solutions list out typically only the name of the caller. That kind of a solution does not satisfactorily indicate to the receiving mobile terminal user from which organization or association the call is made.

One solution for solving the above mentioned problem is disclosed in patent application EP 1 744 526. FIG. 1 depicts the system of EP 1 744 526. In the depicted system the mobile client 11, the caller party A, initiates a voice call 1 to the mobile client 12 of the called party B. The voice call establishment is accomplished via some telecommunications network 10 that may comprise wired and wireless network elements. The communication system of EP 1 744 526 comprises also a library server 13 that has an access 13a to a library database 14 to which some personalized details of users of the mobile client devices are saved.

In the communication system according to EP 1 744 526 the calling mobile client device 11 of the calling party A initiates a call establishment to the mobile client device 12 of the called party B. The initiated call 1 is transferred to the called mobile client 12 through the communications network 10. When the called mobile client 12 gets the call initiation message, the receiving mobile client 12 requests for data (reference 2) associated with the calling party 11 from the library server 13 through a communications network 10. The library server 13 fetches (reference 13a) data associated with the calling party A from the database 14. The library server sends (reference 3) data associated with the calling party A to the mobile client 12. The mobile client 12 shows on its display the received data concerning the called party A, when it alarms the called party B.

The depicted system has following drawbacks. In some situations the mobile client 12 of the called party B may be connected at the call initiation moment to a wireless network where data cannot be transferred during the established voice call. One example is a GSM network and/or GSM device that usually is not supporting GPRS (General Packet Radio Service) data transfer at that time.

A second drawback of the depicted system of EP 1 744 526 is that only the called party B has the power to decide if it receives data associated with the calling party A. The decision is always made in the mobile client 12 of the called party B before a request 2 to the library server 13 is made. It is also true that all calling parties A do not have their caller data saved in the database 13. If it happens very often that any caller data concerning a calling party A cannot be found, the called party B may bypass the caller data fetching loop totally. That kind of a situation is probable if the experienced delay for the called end user turns out to be too long. In that case also the user data of those caller parties A that have saved their user data descriptions in database 14 cannot be brought on the display of the called mobile client 12.

There are also some prior art MMS service solutions (Multimedia Messaging Service), where the calling party is provided with a possibility to have an MMS message linked to the call. One of the disadvantages associated with MMS service solutions is that these services are typically linked with the MMS standard and they do not provide enough possibilities and flexibility in personalization of the call message. Furthermore, one disadvantage in said prior art MMS service solutions is that, when realised, the visible delay for the end user turns out to be too long. These said prior art service solutions are included in the call setting procedure which increases their complexity and makes them somewhat difficult to manage. Typically these kinds of service solutions also require some particular MMS capabilities from the calling party equipment.

SUMMARY OF SOME EXAMPLES OF THE INVENTION

In one aspect, an embodiment of the invention for presenting tailored calling party data in a mobile client device in connection with a voice call comprises:
initiating the voice call in a mobile client of a calling party;
sending a pre-call message from the calling mobile client to a library server;
sending tailored calling party data of the calling party from the library server to a mobile client of a called party preceding a voice call initiation message of the calling mobile client;
connecting the voice call from the mobile client of the calling party to the mobile client of the called party; and
presenting a tailored pre-call calling party data that is at least a part of the tailored calling party data on a display of the mobile client of the called party.

In another aspect, an embodiment of the invention is a communication system for a tailored communication comprises:
a communications network;
a mobile client of a calling party
a mobile client of a called party
a library server having access to a database, in which communication system:
  the library server is configured to fetch tailored calling party data from the database to a mobile client of the called party;
  the mobile client of the calling party is configured to establish a voice call to the mobile client of the called party via the communications network; and
  the mobile client of the called party is configured to present a tailored pre-call calling party data that is at least a part of the tailored calling party data on a display of the mobile terminal of the called party after receiving the tailored calling party data,
in which communication system:
the mobile client of the calling party is configured to send a message concerning identification information of the called party to the library server preceding a call initiation message to the called party; and
the library server is configured to fetch the tailored calling party data of the calling party from the database and to send the tailored calling party data to the mobile client of the called party before the calling mobile client (20) is allowed to transmit a voice call initiation message to the called party.

In a further aspect, an embodiment of the invention for a mobile terminal of a wireless communications network comprises
as a calling client:
  means for sending a pre-call message concerning identification information of a called party to the library server preceding a voice call initiation message;
  means for receiving a response message to said sent pre-call message from the library server; and
  means for transmitting the voice call initiation message to the called party after receiving the response message from the library server;
  and
as a called mobile client:
  means for accepting to receive tailored calling party data from the library server; and if accepted
  means for receiving and presenting the tailored calling party data.

In a further aspect, an embodiment of the invention is a computer program for a calling mobile client utilized in a tailored communications network comprises:
  computer readable code for transmitting a pre-call message, preceding a call initiation message, to a library server concerning identification information of a called party;
  computer readable code for receiving a response message from the library server, and after receiving said message; and
  computer readable code for transmitting a voice call initiation message to a mobile client of the called party after receiving said response message.

In a further aspect, an embodiment of the invention is a computer program for a called mobile client utilized in a tailored communications network comprises:
  computer readable code for receiving a message from a library server informing about a forthcoming voice call;
  computer readable code for accepting to receive a tailored calling party data from the library server;
  computer readable code for receiving the tailored calling party data; and
  computer readable code for presenting the tailored calling party data before the voice call is connected.

Some advantageous embodiments of the invention are disclosed in the dependent claims.

Further scope of applicability of the present invention will become apparent from the detailed description given hereafter. However, it should be understood that the detailed description and specific examples, while indicating advantageous embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus are not limitative of the present invention and wherein.

DETAILED DESCRIPTION OF THE DRAWINGS

In the following description, considered embodiments are merely exemplary, and one skilled in the art may find other ways to implement the invention. Although the specification may refer to "an", "one" or "some" embodiment(s) in several locations, this does not necessarily mean that each such reference is made to the same embodiment(s), or that the feature only applies to a single embodiment or all embodiments. Single feature of different embodiments may also be combined to provide other embodiments.

Figure 1:
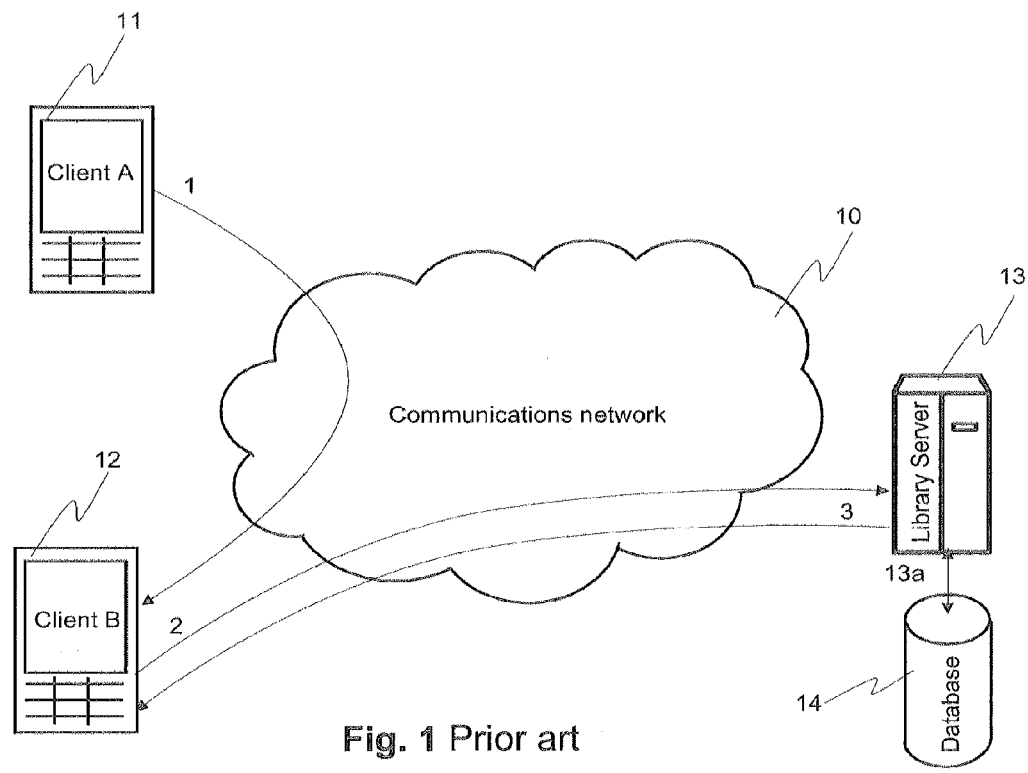
FIG. 1 shows a prior art system including a tailored communication system.

FIG. 1 was discussed in conjunction with the description of the prior art.

Figure 2A:
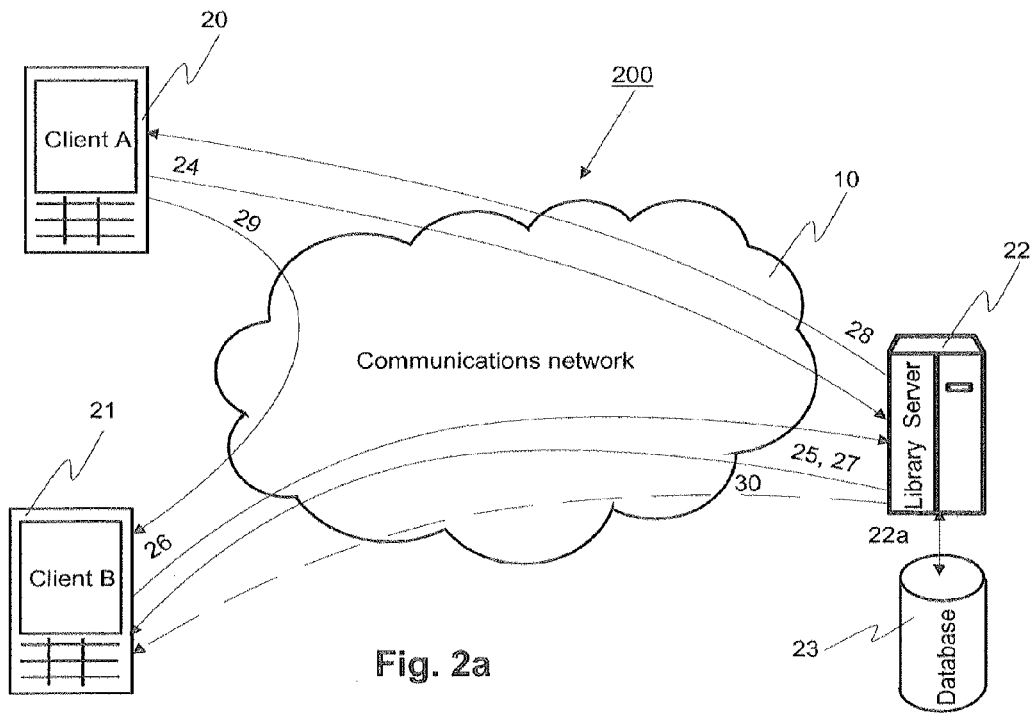
FIG. 2a shows an exemplary embodiment of a communications system according to the invention.

FIG. 2a illustrates an example of the tailored communications system of the present invention where both the calling party A and the called party B utilize mobile client devices. The communication system 200 comprises a communications network 10, a calling mobile client 20 of a calling party A, a receiving mobile client 21 of a called party B, a library server 22 and a database 23 whereto the library server 22 has an access 22a. In the depicted example both the calling mobile client 20 and the called mobile client 21 include an application program according to the invention that is utilized in the tailored communications system.

The communications network 10 that connects at least two mobile clients may comprise any kind of combination of call transfer technologies. It may comprise for example a circuit switching, packet switching, tunnelling, VoIP, etc. The communications network 10 may be any suitable combination of different well-known communications networks such as a GSM, GPRS/EDGE, 3G, LTE or HSDPA network or Internet. The communications network 10 has a call establishing capability between a calling mobile client 20 and a called mobile client 21 or several called clients if a conference call should be established.

The mobile clients 20, 21 may be any terminal devices with call initiation and receiving capabilities such as e.g. a mobile phone, smart phone, portable personal computer or laptop.

The library server 22 is a server specially suited for secure handling of tailored data related to the users, such as e.g. image/text/video/audio data, and having a built-in library database or an access 22a to a library database 23. The library database 23 is specially suited for secure storing of data related to the mobile client users. Advantageously the application program according to the invention in the mobile clients 20 and 21 updates their status to the library server 22 every now and then. The update data may comprise information about the communications network whereto the mobile client 20 or 21 is connected. The update information may also comprise information where the mobile client informs the library server that it can receive calling party data only prior to the call initiation message (i.e. concurrent voice connection and data connection is not possible).

In the communication system of the example of FIG. 2 the calling party A wants to establish a voice call 29 from a mobile client 20 to a mobile client 21 of the called party B. The calling party A has advantageously saved its tailored calling party data in a database 23. In one other advantageous embodiment also the called party B has saved its tailored calling party data in the data base 23.

In another advantageous embodiment the tailored calling party data is saved in a memory of the calling mobile client 20. In that embodiment, the library server 22 has an access to the saved calling party data in the mobile client 20 of the calling party A. In context of a voice call the library server 22 retrieves the calling party data and sends the calling party data of the calling party A to the called mobile client 21 of the called party B.

In another advantageous embodiment the tailored calling party data is saved in a memory of the called client 21. In that embodiment, the library server 22 has an access to the saved calling party data in the mobile client 21 of the called party B. In that embodiment the library server activates the calling party data of the calling party A in the called mobile client 21 of the called party B.

The calling party data of the calling party A may comprise pre-call data, after-call data and/or feedback forms. The tailored calling party data may comprise for example an advertisement of the calling party or some other party.

Figure 7:
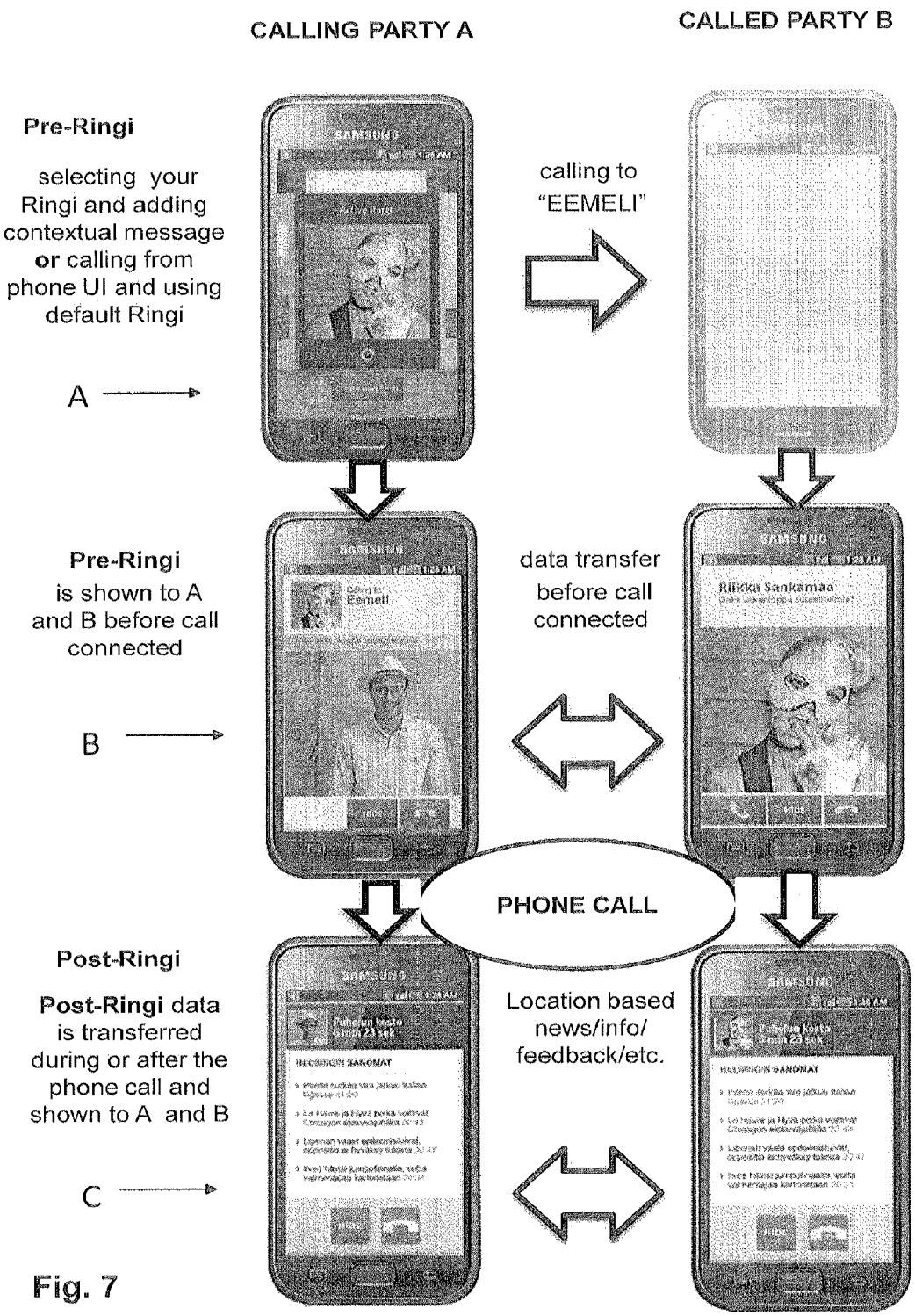
FIG. 7 shows an embodiment of a tailored pre-call and after-call image/text/video/audio data associated with both the calling party and the called party.

The pre-call data of the calling party A may be presented to the mobile client 21 of the calling party B when the mobile client 21 is alerting or going to alert about an incoming voice call (called Pre-Ringi in FIG. 7). The after-call data and feedback forms may be presented to the mobile client 21 of the calling party B when the voice call has been ended (called Post-Ringi in FIG. 7).

In one exemplary embodiment of the communications system according to the invention the application program according to the invention that resides in the mobile client 20 of the calling party A sends a pre-call message 24 to the library server 22. In the pre-call message 24 the calling party A informs that it will establish a voice call to a party B or to a group of called parties, thus establishing a conference call. The library server 22 sends a message 25 to the application program according to the invention that resides in the mobile client 21 of the called party B. The message comprises information depicting that party A will establish a voice call and wants to present at least its pre-call data to the mobile client 21 of the called party B.

The application program in the mobile client 21 of the called party B may accept the request by sending an acceptance message 26 to the library server 22. In that case the library server 22 fetches 22a the required data advantageously from database 23 and sends 27 the calling party data of party A to the mobile client 21 of the called party B. After that the library server 22 informs the application program of the mobile terminal 20 of the calling party A that a voice call initiation message can be sent to the mobile client 21. After that the application program in the mobile client 20 of the calling party A instructs the operating system of the mobile client 20 of the calling party A to establish a voice call to the mobile client 21 of the called party B.

The mobile client 21 of the called party B is now waiting for a voice call initiation message from the mobile client 20. When the mobile client 21 of the called party B receives the call initiation message 29 from the calling client 20, the application program in the mobile client 21 shows the pre-call data on its display at least during alerting the party B.

It is also an alternative that the mobile client 21 of the called party B may reject the request for presenting pre-call data that it has got from the library server 22. In that case the library server 22 informs the mobile terminal 20 of the calling party A that a call initiation message can be sent to the mobile client 21 right away.

It is also an alternative that the library server 22 may reject the request of the calling client 20 if it has not got a response from the mobile client 21 of the called party B in a predetermined time. In that case the library server 22 advantageously informs the application program of the calling client 20 that the calling mobile client is allowed to start the voice call establishment procedure right away.

In these two cases the mobile client 21 of the called party B alerts about the voice call in a normal way.

In an advantageous embodiment all calling party data is transferred from the library server 22 to the mobile client 21 of the called party B in one go. This means that pre-call data/message and/or after-call data and/or feedback forms are all transferred before the calling client 20 sends the voice call initiation message 29. This is advantageous in a situation where the mobile client 21 of the called party B camps in a network where circuit switched voice connection and simultaneous data connection is not allowed.

In one other exemplary embodiment of the communications system according to the invention the pre-call message 24 of the calling party A comprises also a request of the calling party A for receiving the tailored pre-call data of the called party B that is saved in the library server 22. In that embodiment both parties A and B can see the tailored data of the other party (Pre-Ringi in FIG. 7).

In another advantageous embodiment at least a part of the calling party data is transferred from the library server 22 to the mobile client 21 of the called party B when the voice call is in progress 30. That is possible in communications networks that allow concurrent voice connection and data connection between the two mobile clients 20 and 21. The transferred calling party data may be presented on the mobile client of the called party B any time during the voice call. In this embodiment the mobile clients of both parties A and B are also capable for changing case-specific information between each other either during the voice call or after the actual voice call has been disconnected (Post-Ringi in FIG. 7). For example the after-call data or feedback forms may be transmitted 30 to the mobile client 21 of the called party B from the library server 22 during the voice call 29.

The calling party data may comprise any kind of marketing and/or communication applications, such as e.g. mobile marketing, marketing campaigns, brand promotion, corporate promotion, community promotion, customer service, group tailored communications and personalized communications. The tailored calling party data may be tailored according to corporate communication needs of the calling party A.

The format of the tailored calling party data may comprise an image file, text file, video file and/or audio file. The calling party data may comprise any combination of known image formats such as e.g. JPG, known text formats, known video formats such as e.g. DivX, MPEG4, AVI and known audio formats. The receiving mobile client 21 of the called party B presents the tailored calling party data on the display and/or speaker with the help of applicable software that is installed in the memory of the mobile client 21.

The embodiments of the invention offer several technical effects. Firstly, the tailored calling party data can be transferred to the mobile client of the called party B also in communications networks where concurrent circuit switched voice call and a data connection is not allowed or possible.

A second technical effect is that calling party data can be transferred from the calling mobile client to the called mobile client also in cases where one of the mobile platforms does not allow any application program an access to the outgoing or incoming phone number information.

A further technical effect is that the calling party A can independently offer calling party data to those called parties B that most probably want to receive it.

A further technical effect is that the called party B can choose if it wants to receive or is capable of receiving the offered calling party data of party A.

A further technical effect is that the called party B can before answering the incoming call receive such footnote information that he or she can use in making a decision to answer or not to answer the incoming call. Also the calling party A benefits from this feature because if the called party B answers, the calling party A knows that the party B is interested in discussing with the party A.

In the above-depicted example both the calling party A and the called party B utilize mobile client devices, references 20 and 21. However, in one advantageous embodiment the calling party A may utilize a communication device that is not a mobile client device. In that embodiment the communication device of party A may be connected by wire line to the communications network 10. Some examples of possible communications devices that may be utilized in this embodiment are a personal computer having a microphone and speaker and information processing devices of a call center system.

A call center is a centralized office used for receiving and transmitting many requests mainly by telephone. A call center may also be presented as a calling party to the called party. In that embodiment several persons inside the calling center may be presented to the called party by one and same tailored calling party data. Some services of a call center are for example outgoing calls for telemarketing, clientele, product services and debt collection. In the call center work so called call center agents with work stations that include a computer for each agent, a telephone set/headset connected to a telecom switch and some supervisor stations.

A so-called contact center is a central point of an organization from which all customer contacts are managed. Through contact center valuable information about the company may be routed to appropriate people, contacts to be tracked and data to be gathered. The contact center can utilize the same kind of tools as a call center.

In one advantageous embodiment the called party B utilizes a communication device that has a wire line connection to the communications network 10. The communication device of the called party B may be for example a personal computer having a microphone and speaker.

Figure 2B:
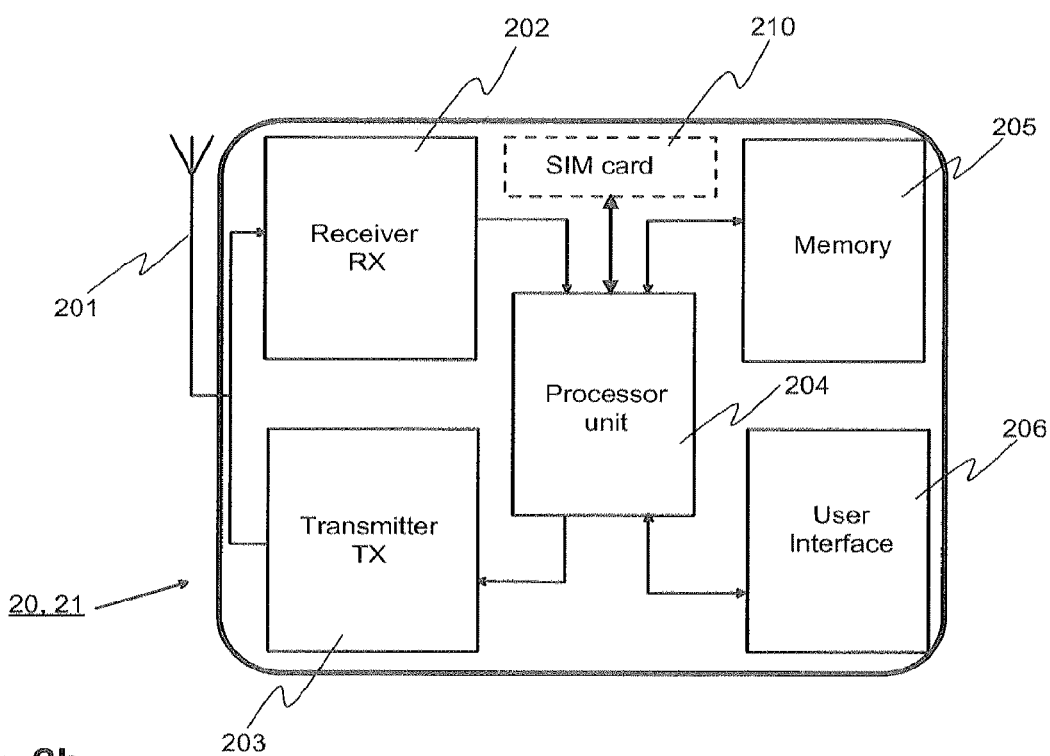
FIG. 2b shows the main parts of a mobile terminal device according to the invention by way of example.

FIG. 2b shows, by way of example, the main functional parts of a mobile client 20, 21 of a cellular network 10 capable of utilizing the method according to the invention. The mobile client 20, 21 can be, for example, a prior art GSM, GPRS or UMTS mobile client.

The mobile client 20, 21 uses an antenna 201 in the transmission and reception of signals with the serving cellular network. The receiver RX of the mobile client 20, 21 is shown by reference 202. The receiver RX comprises prior art means for all messages or signals to be received.

Reference 203 denotes the transmitter TX of the terminal device 20, 21. All the signal processing measures required when transmitting to the serving cellular network are performed by the transmitter means 203.

In the mobile client 20, 21 the processor unit 204 controls operations of the transmitter 203 and receiver 202. It controls also the memory 205, in which the application program required in the implementation of the method according to the invention can advantageously be saved. In one advantageous embodiment the tailored calling party data is saved in the memory of the calling mobile client 20. In another advantageous embodiment the tailored calling party data is saved in the memory of the called mobile client 21.

The processor unit 204 advantageously accomplishes process steps of the invention by executing proper computer program code instructions according to the embodiments of the invention. The processor unit 204 may be implemented by a processor, which may comprise but is not limited to one microprocessor. It may also comprise at least one processor with an accompanying digital signal processor or one or more special-purpose computer chips, one or more field-programmable gate arrays (FPGA), one or more controllers and one or more application-specific integrated circuits (ASICS).

In said execution of offering, requesting and/or presenting tailored calling party data the processor unit 204 utilizes advantageously computer program code instructions saved in the memory 205. The memory 205 may comprise advantageously one or more internal and/or external memories (e.g., ROM, RAM, FLASH, USB, CD-ROM, etc.). The memory 205 is advantageously capable of saving computer program code which is utilized in the embodiments of the invention.

The mobile client 20, 21 also comprises a user interface 206. It comprises at least a display and keyboard functions (not shown in FIG. 2b). The keyboard functions may be accomplished either by actual keys or touch screen keys.

When operating in a prior art cellular network 10, such as the GSM network, the terminal device 20, 21 also requires a separate SIM card 210 that is installed in the mobile client 20, 21.

Figure 3:
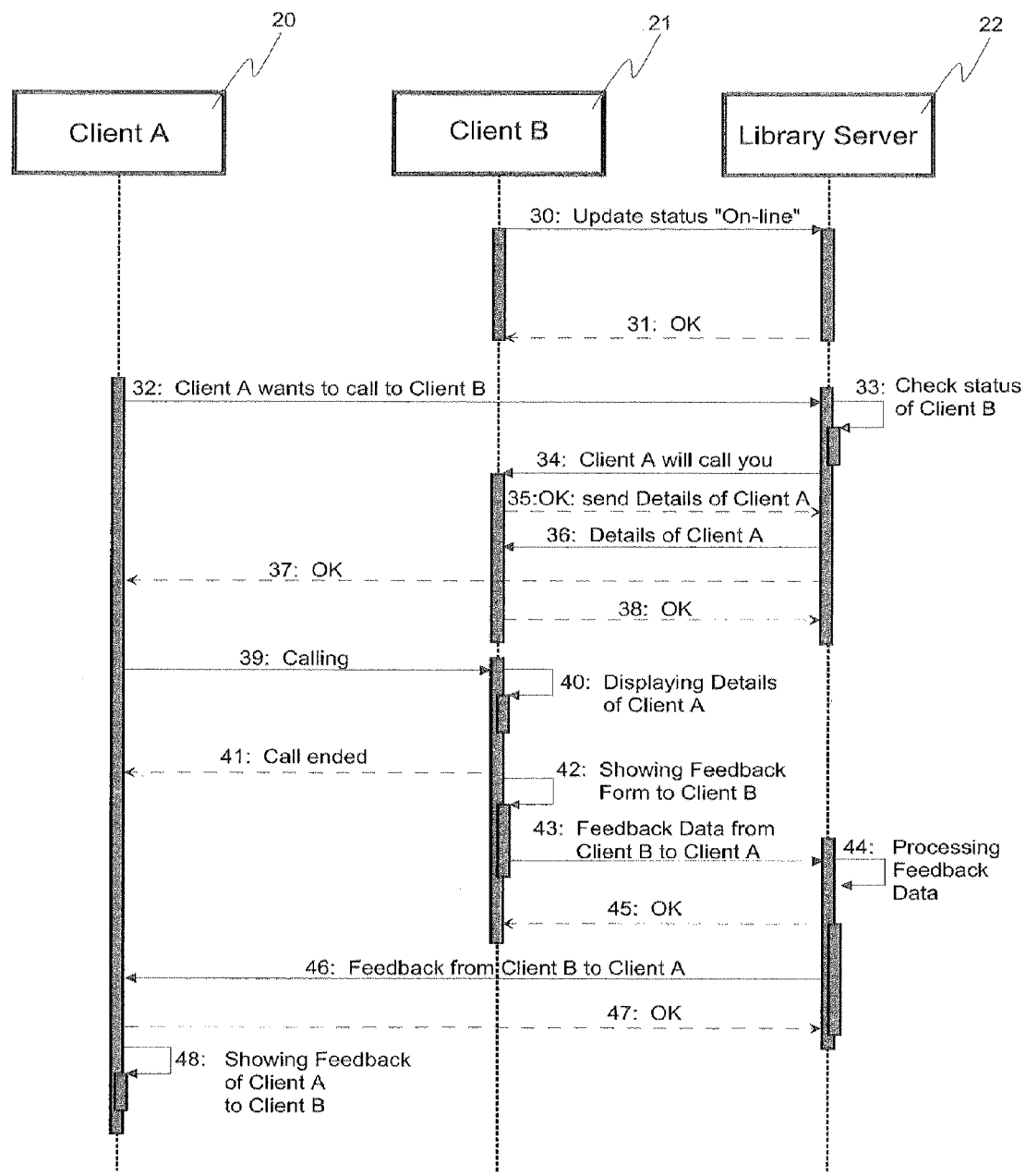
FIG. 3 shows as an exemplary sequence diagram of the method according to the invention.

FIG. 3 shows a simplified and exemplary sequence diagram according one advantageous embodiment of the invention. The depicted embodiment is especially suitable to be utilized in telecommunications networks where concurrent voice call and data transmission is not allowed. In the depicted example Client A, reference 20, wants to establish a voice call to Client B, reference 21, and in that context Client A wants to offer its calling client data to Client B. For accomplishing this task Client A utilizes the resources of the library server 22.

Client A has advantageously saved its calling party data either in the server 22 or in a database 23 accessible by the library server 22.

Once in a while mobile Client B, reference 21, updates its status, references 30 and 31, to the library server 22. After the status update the library server 22 is aware of in what kind of a network the mobile client 21 is camping.

The application program according to the invention residing in the mobile Client A sends a pre-call message to the library server 22, its intention to establish a voice call to Client B, reference 32. The library server 22 checks the current status of Client B, reference 33.

After checking the status of mobile Client B the library server 22 sends a message 34 to application program according to the invention residing in the mobile Client B. The message includes that Client A will call you and wants to present its calling party data to Client B. In the depicted example Client B answers "Ok send Details of Client A", reference 35. After getting an acceptance message, the library server 22 sends "Details of Client A" (i.e. calling client data of party A) to the application program of the mobile Client B. In one advantageous embodiment the calling client data of Client A comprises a pre-call message, after-call message and/or feedback form. In another advantageous embodiment the calling client data of Client A comprises a pre-call message.

When the library server has sent "the Details of Client A" to the application program of the mobile Client B, it sends a message to the application program of the mobile Client A that it has transmitted the calling party data of party A to the mobile client B, reference 37.

When Client B has received in its entirety the calling client data of party A, it sends "OK" message to the library server 22.

After getting "OK" message 37 from the library server 22, the application program of the mobile Client A instructs the mobile client 20 to send a call initiation message to the supporting communications network, i.e. Client A calls Client B. When Client B is alerting pre-call data of the calling client A shows on its display.

If for some reason the library server 22 has not got an answer from the mobile client 21 of the called party B in a predetermined time, the library server 22 authorizes the mobile client 20 of the calling party A to establish the voice call immediately.

In one advantageous embodiment the calling mobile client 20 is authorised to start voice call procedures if it has not got any message from the library server 22 in a predetermined time after a sent pre-call message.

In the exemplary sequence diagram of FIG. 3 it is not shown that in some advantageous embodiments of the invention a part of the calling client data (i.e. after-call data and/or feedback form) may be received by the called Client B when the voice call is in progress. In that case the utilized telecommunications network as whole is able to support concurrent voice call and data transfer.

When the voice call has been ended, reference 41, after-call data and/or feedback form may be shown on the display of Client B, reference 42. When Client B answers to the after-call data and/or feedback form, the answer is transmitted 43 to the library server 22. The library server 22 processes 44 the answer of Client B and sends "OK" message back to Client B.

After that the library server 22 may send 46 the processed answer of Client B to the calling Client A that answers by a message "OK" 47 when it has received the processed data. Then the feedback of Client B is shown 48 on the display of Client A.

In one advantageous embodiment the library server 22 maintains in the database 23 statistics of the feedback. The calling party A can study the accumulated feedback data.

Figure 4A:
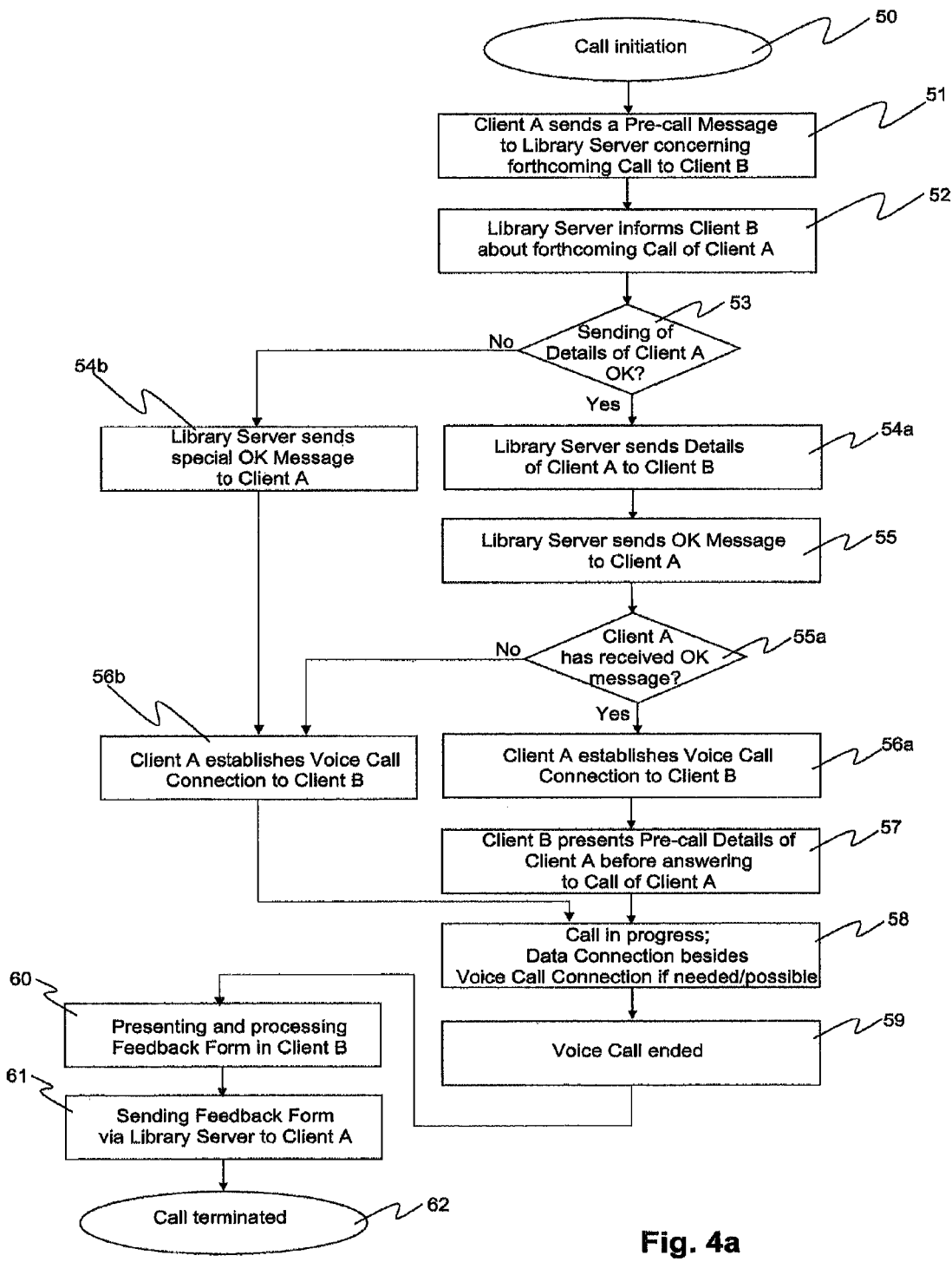
FIG. 4a shows as an exemplary flow chart of the main steps of the method according to a first embodiment of the invention.

The main functional steps of the first embodiment of the invention are shown as an exemplary flow chart in FIG. 4a. The method steps depict an embodiment where both the calling party A and the called party B utilize mobile client devices. The depicted embodiment is especially suitable to be utilized in telecommunications networks where concurrent voice call and data transmission is not allowed. In the process the conditions for presenting the calling party data of the party A to the called party B is checked before the mobile client of party A is allowed to start voice call establishment procedures.

The process starts in step 50 where the calling party A, i.e. the user of the mobile client 20, initiates a voice call to the mobile client 21 of the called party B. This is achieved through selecting or activating number or address/identification information of the called party B in the user interface 206 of the calling mobile client 20. When the mobile client 21 of the called party B has been selected, then in step 51 the application program according to the invention in the calling client 20 sends a pre-call message to the library server 22 in which pre-call message the mobile client 20 informs the library server 22 that the calling party A wants to establish a voice call at least to the mobile client 21 of the called party B.

In step 52 the library server 22 informs the application program in the called mobile client 21 of the called party B about a forthcoming voice call from the mobile client 20 of the calling party A.

In step 53 the mobile client 21 of the called party B may either accept that the calling client data of the calling party A will be transmitted from the library server 22 to the mobile client 21 of the called party B (alternative Yes) or reject the proposed transmission of the calling client data of the calling party A (alternative No).

If the decision in step 53 is "Yes", the library server 22 sends the calling party data of the calling party A to the application program of the mobile client 21 of the called party B in step 54a.

After that the library server 22 sends "OK" message to the application program of the calling mobile client 20 of the calling party A in step 55.

It is obvious to a man skilled in the art that the depicted steps 54a and 55 may naturally be accomplished also in a reversed order, i.e. first step 55 and then step 54a.

In step 55a the application program of the mobile client 20 of the calling party A checks if it has got the "OK" message from the library server 22 in a predetermined time. If the answer is lacking, the application program of the mobile client 20 of the calling party A instructs the operating system of the mobile client 20 to start voice call establishment procedures immediately in step 56b without any calling party data. One reason for not getting "OK" message in a predetermined time may be that the library server 22 has not succeeded in accomplishing functions either in step 52 or step 54a.

If the application program of the mobile client 20 of the calling party A has received "OK" message from the library server 22, then in step 56a the calling mobile client 20 of the calling party A is instructed to establish a voice call to the mobile client 21 of the called party B. The voice call 29 is established by utilizing procedures of the supporting communications network 10.

When the voice call initiation message arrives in the mobile client 21 of the called party B, then during alerting the application program of the called mobile client 21 presents the calling party data of the calling party A in step 57. The presented calling party data may comprise an image, text, video or audio data or a combination of at least two of them.

In step 58 the voice call between parties A and B is in progress.

If the decision in step 53 is "No", the library server 22 sends a "special OK" message to the application program of the calling mobile client 20 in step 54b.

In one advantageous embodiment the library server 22 generates the "special OK" message also if it has not got any response during a predetermined time from the called mobile client 21 of the called party B.

After receiving the "special OK" message the calling mobile client 20 is allowed to initiate the voice call in step 56b. However, the calling mobile client 20 may present to the calling party A that calling party data is not usable this time.

The voice call is established and the call is in progress in step 58.

In one advantageous embodiment at least a part of the calling party data is conveyed from the library server 22 to the mobile client 21 of the called party B concurrent the voice call by utilizing a concurrent data connection. For example the after-call data and/or feedback form may be conveyed to the mobile client 21.

In step 59 the call has been ended. The ending launches either an after-call message or a feedback form on the display of the mobile client 21 of the called party B in step 60. The called party B may input answers to the feedback form and that way finally terminate the voice call.

In step 61 the library server 22 receives the feedback from the application program of the mobile client 21 of the called party B. The library server 22 processes the feedback form and may send the processed feedback form to the application program of the mobile client 20 of the calling party A where the feedback may be shown on the mobile client 20 of the calling party A.

In another advantageous embodiment the library server 22 maintains in the database 23 statistics of the given feedback. In that embodiment the calling party A has access to the statistics In step 62 the voice call is totally terminated.

Figure 4B:
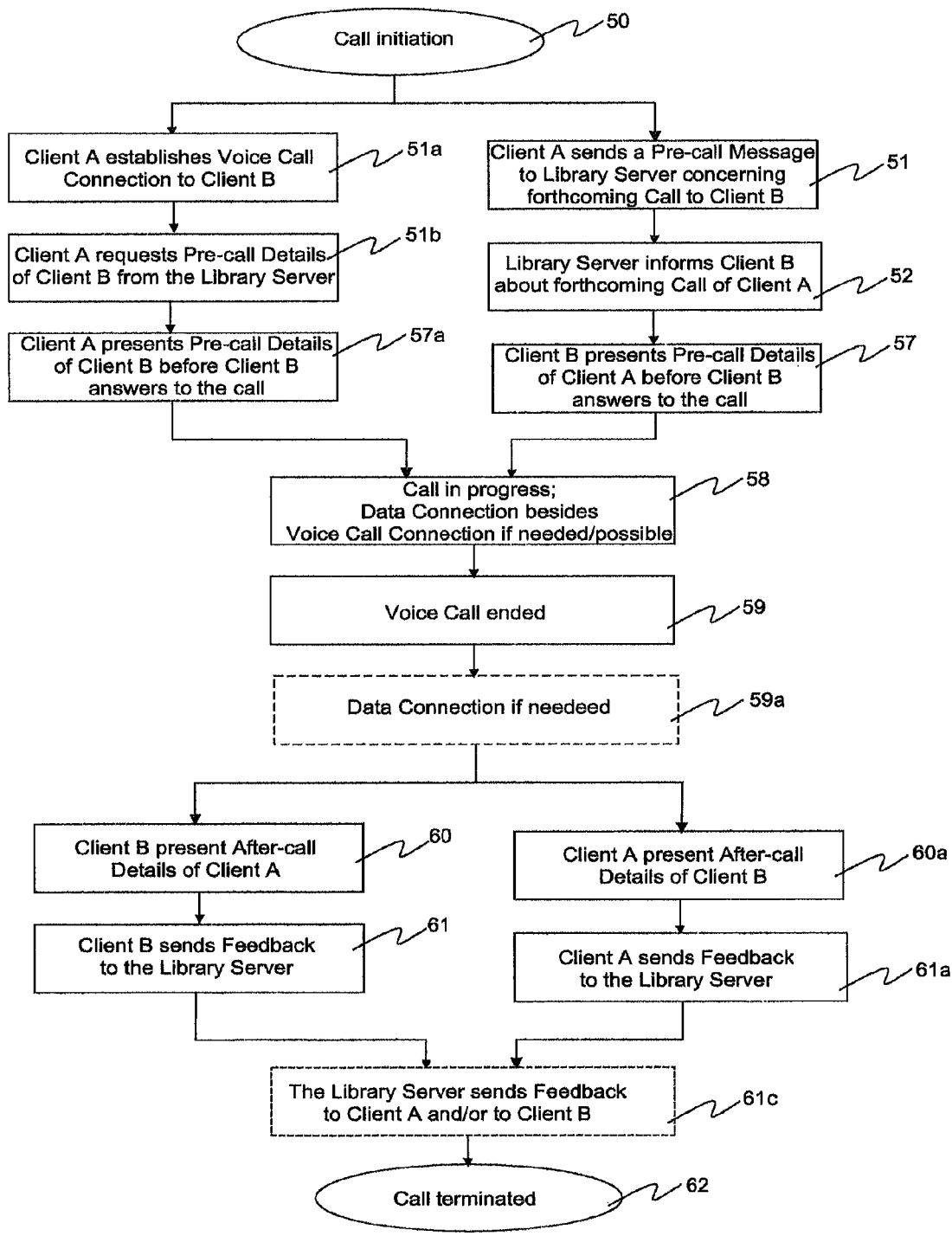
FIG. 4b shows an exemplary flow chart of the main steps of the method according to a second embodiment of the invention.

The main functional steps of a second embodiment of the invention are shown as an exemplary flow chart in FIG. 4b. In the exemplary flow chart some of the reference numbers are the same as in FIG. 4a. In that case the functions of the method step correspond to the functions depicted in FIG. 4a.

The method steps of FIG. 4a depict an embodiment where advantageously both the calling party A and the called party B utilize mobile client devices. The depicted embodiment is especially suitable to be utilized in telecommunications network where concurrent voice call and data transmission is allowed. In this advantageous embodiment the process for presenting the calling party data of the party A to the called party B is started concurrently to the voice call establishment signalling.

The process starts in step 50 where the calling party A, i.e. the user of the mobile client 20, initiates a voice call to the mobile client 21 of the called party B. This is achieved through selecting or activating number or address/identification information of the called party B in the user interface 206 of the calling mobile client 20. When the mobile client 21 of the called party B has been selected, then in step 51 the application program according to the invention in the calling client 20 sends a pre-call message to the library server 22 in which pre-call message the mobile client 20 informs the library server 22 that the calling party A wants to establish a voice call at least to the mobile client 21 of the called party B.

In step 52 the library server 22 informs the application program in the called mobile client 21 of the called party B about a forthcoming voice call from the mobile client 20 of the calling party A.

When the voice call initiation message arrives in the mobile client 21 of the called party B, then at least during alerting the application program of the called mobile client 21 the calling party data of the calling party A is presented in step 57. The presented calling party data may comprise an image, text, video or audio data or a combination of at least two of them.

Concurrently to the above depicted step 51 the mobile client 20 of the calling party A starts in step 51a voice call connection procedure for a voice call to the mobile client 21 of the called party B. The call connection is advantageously achieved by utilizing protocols of the current telecommunications network.

After starting the voice call connection procedures the mobile client 20 of the calling party A request pre-call data of the called party B from the library server 22 in step 51b.

When the response from the library server 22 arrives in the mobile client 20 of the calling party A, then the application program of the calling mobile client 20 presents the called party data of the called party B in step 57a. The presented called party data may comprise an image, text, video or audio data or a combination of at least two of them.

In step 58 the voice call between parties A and B has been connected and it is in progress. During the voice call both parties A and B may transfer data to the other party. The transferred data may be case-specific. For example, at least a part of the calling party data is conveyed from the library server 22 to the mobile client 21 of the called party B concurrent the voice call by utilizing a concurrent data connection. For example, the after-call data and/or feedback form may be conveyed to the mobile client 21.

The transferred data between the parties may also be defined during the voice call. An example of that is a case where a call center of a company sends to its customer some benefit for one thing and another.

In step 59 the actual voice call is terminated.

However, in one embodiment in an optional step 59a a data transfer connection between the parties A and B may continue for a while after the termination of the actual voice connection. The data transfer connection may be active for example a predetermined time. Or in another case the data transfer connection is disconnected when a defined condition concerning A or B has been fulfilled.

The ending of the voice call either in step 59 or in step 59a may launch an after-call message or a feedback form on the display of the mobile client 21 of the called party B in step 60. The called party B may input answers to the feedback form and that way finally terminate the voice call.

In step 61 the library server 22 receives the feedback from the application program of the mobile client 21 of the called party B.

The ending of the voice call either in step 59 or in step 59a may also launch an after-call message or a feedback form on the display of the mobile client 20 of the calling party A in step 60a. The calling party A may input answers to the feedback form.

In step 61a the library server 22 receives the feedback from the application program of the mobile client 20 of the calling party A.

In an optional step 61c the library server 22 may process the feedback form and may send the processed feedback form to the application program of the mobile client 20 of the calling party A and the processed feedback form to the application program of the mobile client 21 of the called party B. The feedback of one party may be shown on the mobile client of the other party.

In one advantageous embodiment the library server 22 maintains in the database 23 statistics of the given feedback. In that embodiment the calling party A or the called party B has access to the statistics.

In step 62 the voice call is totally terminated.

Figure 5A:
FIG. 5a shows an embodiment of a tailored pre-call image/text/video/audio data associated with the calling party.
Figure 5B:
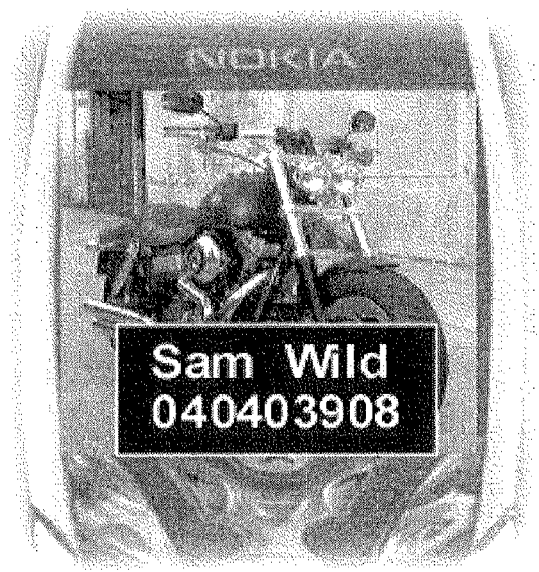
FIG. 5b shows another embodiment of a tailored pre-call image/text/video/audio data associated with the calling party.

FIGS. 5a and 5b show examples of a tailored image/text/video/audio data associated with the calling party according to the present invention. The examples depict pre-call data that is presented on the mobile client 21 of the called party B.

In the example of FIG. 5a the pre-call data comprises a company logo, company name, name of the calling person and the number of the calling person.

In the example of FIG. 5b the pre-call data comprises a tailored image, name of the calling person and the number of the calling person.

Figure 6A:
FIG. 6a shows an embodiment of a tailored after-call image/text/video/audio data associated with the calling party.
Figure 6B:
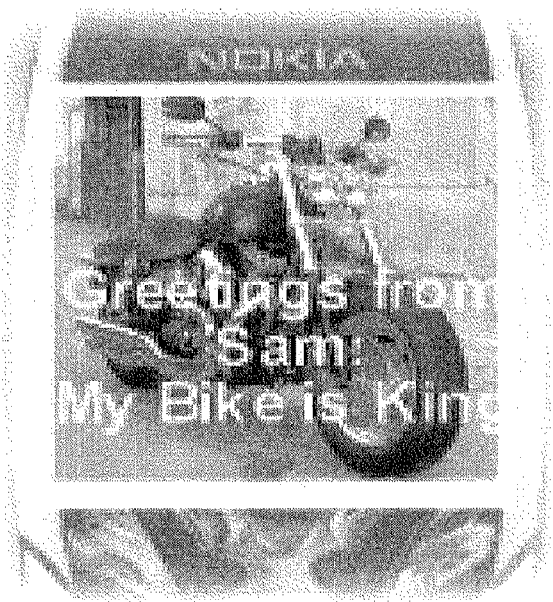
FIG. 6b shows another embodiment of a tailored after-call image/text/video/audio data associated with the calling party.

FIGS. 6a and 6b show examples of a tailored image/text/video/audio data associated with the calling party according to the present invention. The examples depict after-call data that is presented on the mobile client 21 of the called party B.

In the example of FIG. 6a the after-call data comprises a company logo, company name and end compliments.

In the example of FIG. 6b the after-call data comprises a tailored image and greetings from the calling person.

In FIG. 7 is depicted an example where pre-call data (called Pre-Ringi) and after-call data (called Post-Ringi) is utilized by the method steps of the flowchart that is depicted in FIG. 4b. In step A of FIG. 7 the calling party A wants to call to a party B that is a person Eemeli by name. The calling party A wants to utilize her tailored pre-call data in the coming voice call.

In step B the pre-call data of the calling party A has been transmitted to the mobile client device of the called person Eemeli. If Eemeli allows, also his pre-call data may be transmitted to the mobile client device of the calling party A. The actual voice call takes place in step B of FIG. 7.

Step C of FIG. 7 may be accomplished either during the voice call (if the network technology allows it) or immediately after the disconnection procedure of the actual voice connection has been launched. During step C of FIG. 7 a data transfer connection between the parties A and B may be sustained for some time. By this connection information can be changed between the parties A and B for resolving at least one item that was discussed during the voice call.

The method steps depicted in FIGS. 3, 4a, 4b and 7 to process the tailored calling party data or called party data may be accomplished by proper computer programs. A first computer program is installed in the memories 205 of the mobile clients 20 and 21 and a second computer program is installed in the memory of the library server 22. The computer programs may also be saved on a transitory data storage medium wherefrom the programs may be installed to the mobile clients 20 and 21 and to the library server 22.

Some advantageous embodiments according to the invention were described above. The invention is not limited to the embodiments described. The inventive idea can be applied in numerous ways within the scope defined by the claims attacked hereto.

The invention claimed is:

1. A method for presenting tailored calling party data in a mobile client device in connection with a voice call, the method comprising:
    initiating the voice call in a mobile client of a calling party;
    sending a pre-call message from the calling mobile client to a library server before starting a call connection procedure to a mobile client of a called party;
    monitoring, at the library server, an elapsed time since the library server received a response from the mobile client of the called party;
    starting the call connection procedure to the mobile client of the called party if the elapsed time is greater than a predetermined threshold;
    if the elapsed time is less than the predetermined threshold, presenting a prompt at the mobile client of the called party to accept the tailored calling party data and, if the mobile client of the called party accepts, sending tailored calling party data of the calling party from the library server to the mobile client of a called party preceding a voice call initiation message belonging to the call connection procedure of the calling mobile client;
    starting the call connection procedure to the mobile client of a called party;
    connecting the voice call from the mobile client of the calling party to the mobile client of the called party; and
    presenting during alerting the incoming call a tailored pre-call calling party data that is at least a part of the tailored calling party data on a display of the mobile client of the called party.

2. The method according to claim 1, wherein in the pre-call message sending phase the mobile client of the calling party sends identification information of the called party to the library server.

3. The method according to claim 1, wherein the sending phase of the tailored calling party data comprises:

checking in the library server if the mobile client of the called party accepts the tailored calling party data;

wherein if the mobile client of the called party accepts, sending the tailored calling party data from the library server to mobile client of the called party.

4. The method according to claim 1, wherein the method further comprises:

requesting in the pre-call message the library server to send tailored called party data to the mobile client of the calling party; and presenting a tailored called party data of the called party on a display of the mobile client of the calling party.

5. The method according to claim 4, wherein concurrently the voice connection and a data transfer connection are active between the mobile client of the calling party and the mobile client of the called party for changing tailored calling party data and tailored called party data between the parties.

6. The method according to claims 5, wherein the method further comprises a phase where after-call data, that is a part of the tailored calling party data, is shown on the display of the mobile client of the called party when the actual voice call has ended.

7. The method according to claim 6, wherein the voice call connection is terminated by processing and closing the tailored after-call data session in the mobile client of the called party.

8. A communication system for a tailored communication comprising:

a communications network;

a mobile client of a calling party that is configured to send a pre-call message concerning identification information of the called party to a library server preceding a call initiation message to the called party before starting a call connection procedure;

a mobile client of a called party; and a library server having access to a database;

in which communication system:

the library server is configured to monitor an elapsed time since the library server received a response from the mobile client of the called party, and if the elapsed time is less than a predetermined threshold to present a prompt at the mobile client of the called party to accept tailored calling party data, and if the mobile client of the called party accepts, to fetch tailored calling party data from the database and to send the tailored calling party data to a mobile client of the called party before the calling mobile client is configured to start a call connection procedure to the mobile client of the called party, and if the elapsed time is greater than the predetermined threshold to start the call connection procedure to the mobile client of the called party;

the mobile client of the calling party is configured to establish a voice call to the mobile client of the called party via the communications network; and the mobile client of the called party is configured to present during alerting the incoming call a tailored pre-call calling party data that is at least a part of the tailored calling party data on a display of the mobile terminal of the called party after receiving the tailored calling party data.

9. The communication system according to claim 8, wherein that the library server is configured to send the calling party data to the mobile client of the called party before the calling mobile client is allowed to transmit a voice call initiation message to the called party.

10. The communication system according to claim 9, wherein the library server is configured to:

check if the mobile client of the called party accepts to receive the tailored calling party data of the calling party, and if accepted;

send the tailored calling party data to mobile client of the called party.

11. The communication system according to claim 8, wherein the mobile client of the calling party is configured to:

request in the pre-call message the library server to send tailored called party data to the mobile client of the calling party; and present a tailored called party data of the called party on the display of the mobile client of the calling party.

12. The communication system according to claim 8, wherein the mobile client of the called party is configured to present, with the tailored pre-call calling party data, a request to transfer tailored called party data of the called party to the mobile client of the calling party; and wherein the library server is configured to send the tailored called party data of the called party to the mobile client of the calling party, upon acceptance of the request.

13. The communication system according to claim 8, wherein the mobile client of the called party is further configured to show on the display of the mobile client tailored after-call data that is a part of the tailored calling party data when the actual voice call has ended.

14. The communication system according to claim 13, wherein the mobile client of the called party is configured to terminate the voice call by processing and closing the tailored after-call data in the mobile client of the called party.

15. The communication system according to claim 8, wherein the tailored calling party data comprises at least one of the following: an image file, a text file, a video file or an audio file.

16. A mobile terminal of a wireless communications network, that as a calling mobile client comprises:

means for sending a pre-call message concerning identification information of a called mobile client to the library server before starting a call connection procedure to the called mobile client;

means for receiving a response message to said sent pre-call message from the library server indicating an elapsed time since the library server received a response from the mobile client of the called party as monitored by the library server; and means for transmitting a voice call initiation message belonging to the call connection procedure to the called mobile client after receiving the response message from the library server if the elapsed time is greater than a predetermined threshold; and that as a called mobile client comprises:

means for presenting a prompt to accept the tailored calling party data;

means for accepting to receive tailored calling party data from the library server; and if accepted means for receiving and presenting the tailored calling party data during alerting an incoming call.

17. The mobile terminal according to claim 16, wherein the transmitter for sending the pre-call message to the library server is configured to send the pre-call message before the voice call initiation message to the called mobile client has been generated.

18. The mobile terminal according to claim 16, wherein said means in the calling client comprise:
a processor; and
a memory including a computer program code,
the memory and the computer program code configured to, with the processor, cause the mobile client at least to:
send a pre-call message concerning identification information of a called mobile client to the library server preceding a call initiation message belonging to the call connection procedure;
receive a response message to said sent pre-call message from the library server; and
send a call initiation message belonging to the call connection procedure after receiving the response message from the library server.

19. The mobile terminal according to claim 16, wherein said means in the called client comprise:
a processor; and
a memory including a computer program code,
the memory and the computer program code configured to, with the processor, cause the mobile client at least to:
accept receiving tailored calling party data from the library server; and if accepted
receive and present the tailored calling party data.

20. A computer-readable non-transitory data storage medium comprising a computer program for a calling mobile client of a tailored communications network, the computer product including:
computer readable code for transmitting from the calling mobile client a pre-call message preceding a call initiation message belonging to the call connection procedure to a library server concerning identification information of a called mobile client;
computer readable code for receiving a response message from the library server indicating an elapsed time since the library server received a response from the mobile client of the called party as monitored by the library server, and further indicating if the library server sent tailored calling party data to the called mobile client;
computer readable code for requesting the library server to send tailored called party data to the mobile client of the calling party;
computer readable code for presenting a prompt at the mobile client of the called party to accept the tailored calling party data;
computer readable code for presenting a tailored called party data on a display of the mobile client of the called party, if the mobile client of the called party accepts the tailored calling party data; and
computer readable code for transmitting a voice call initiation message belonging to the call connection procedure to the mobile client of the called party after receiving said response message and if the elapsed time is greater than a predetermined threshold or if the library server sent the tailored calling party data to the called mobile client.

21. A computer-readable non-transitory data storage medium comprising a computer program for a called mobile client of a tailored communications network, the computer product including:
computer readable code for receiving a message from a library server informing about a forthcoming voice call from a calling party if the library server has received a response from the called mobile client within a predetermined elapsed time;
computer readable code for presenting a prompt to accept tailored calling party data from the library server;
computer readable code for accepting to receive the tailored calling party data from the library server;
computer readable code for receiving the tailored calling party data; and
computer readable code for presenting during alerting the incoming call the tailored calling party data if the library server has received a response from the called mobile client within the predetermined elapsed time; and
computer readable code for alerting the incoming call if the library server has not received a response from the called mobile client within the predetermined elapsed time.

22. The non-transitory data storage medium according to claim 21, which further comprises:
computer readable code for presenting and processing a feedback form when the actual voice call has ended; and
computer readable code for terminating the voice call when the processing of the feedback form session has been accomplished.

23. The non-transitory data storage medium according to claim 21, which further comprises computer readable code for transferring data concurrently the voice connection between the mobile client of the calling party and the mobile client of the called party for changing tailored calling party data and tailored called party data between the parties.

* * * * *